United States Patent
Ma et al.

(10) Patent No.: US 10,914,538 B2
(45) Date of Patent: Feb. 9, 2021

(54) HEAT DISSIPATION RETAINING STRUCTURE FOR HEAT PRODUCTION DEVICE, INSTALLATION METHOD THEREOF, AND WIND TURBINE GENERATOR SET

(71) Applicant: BEIJING GOLDWIND SCIENCE & CREATION WINDPOWER EQUIPMENT CO., LTD., Beijing (CN)

(72) Inventors: Shengjun Ma, Beijing (CN); Wanshun Ma, Beijing (CN)

(73) Assignee: Beijing Goldwind Science & Creation Windpower Equipment Co., Ltd, Beijing (CN)

( * ) Notice: Subject to any disclaimer, the term of this patent is extended or adjusted under 35 U.S.C. 154(b) by 0 days.

(21) Appl. No.: 15/578,644

(22) PCT Filed: Jul. 11, 2016

(86) PCT No.: PCT/CN2016/089628
§ 371 (c)(1),
(2) Date: Nov. 30, 2017

(87) PCT Pub. No.: WO2017/008714
PCT Pub. Date: Jan. 19, 2017

(65) Prior Publication Data
US 2018/0306532 A1    Oct. 25, 2018

(30) Foreign Application Priority Data

Jul. 10, 2015 (CN) .......................... 2015 1 0405679

(51) Int. Cl.
*F28F 13/18* (2006.01)
*F03D 80/60* (2016.01)
(Continued)

(52) U.S. Cl.
CPC .............. *F28F 13/18* (2013.01); *F03D 80/60* (2016.05); *F03D 80/82* (2016.05); *F03D 80/85* (2016.05);
(Continued)

(58) Field of Classification Search
CPC .......... F28F 13/18; F03D 80/82; F03D 80/85; F03D 80/60; F03D 9/25; F05B 2260/231;
(Continued)

(56) References Cited

U.S. PATENT DOCUMENTS 4,143,815 A * 3/1979 Meysenburg ......... F24D 11/007
                                                                237/2 B
4,293,785 A    10/1981 Jackson, Jr.
(Continued)

FOREIGN PATENT DOCUMENTS

CN    2444011 Y    8/2001
CN    2869192 Y    2/2007
(Continued)

OTHER PUBLICATIONS

First Office Action issued by the Australian IP Office in Australian Patent Application No. 2016292053, dated Oct. 29, 2018.
(Continued)

*Primary Examiner* — Basil S Katcheves
*Assistant Examiner* — Omar F Hijaz
(74) *Attorney, Agent, or Firm* — Finnegan, Henderson, Farabow, Garrett & Dunner LLP

(57) ABSTRACT

A heat dissipation retaining structure for a heat production device, an installation method thereof, and a wind turbine generator set. The heat dissipation retaining structure includes a retaining structure body for defining a middle space, and a thermal radiation absorption coating, a heat insulating material, or an infrared low-emissivity and high-reflectivity material is at least partially applied to an inner (Continued)

wall of the retaining structure body. The air temperature of the environment in the retaining structure is actively decreased by the foregoing structure under the conditions that noise is avoided, environmental friendliness is achieved, external power is omitted, and energy consumption is zero, thereby decreasing the temperature of the heat production device, and ensuring that the heat production device works at the allowable normal temperature for a long time.

21 Claims, 7 Drawing Sheets

(51) Int. Cl.
*F03D 80/80* (2016.01)
*F24S 80/56* (2018.01)
*F24S 70/20* (2018.01)
*F03D 9/25* (2016.01)

(52) U.S. Cl.
CPC .............. *F24S 70/20* (2018.05); *F24S 80/56* (2018.05); *F03D 9/25* (2016.05); *F05B 2240/912* (2013.01); *F05B 2260/20* (2013.01); *F05B 2260/221* (2013.01); *F05B 2260/231* (2013.01); *Y02E 10/72* (2013.01); *Y02E 10/728* (2013.01); *Y02P 70/50* (2015.11)

(58) Field of Classification Search
CPC .......... F05B 2260/221; F05B 2240/912; F05B 2260/20; Y02E 10/728; Y02E 10/722; Y02P 70/523
See application file for complete search history.

(56) References Cited

U.S. PATENT DOCUMENTS

| | | |
|---|---|---|
| 6,317,321 B1 | 11/2001 | Fitch et al. |
| 2009/0095525 A1* | 4/2009 | Watanabe .......... B60R 16/0207 |
| | | 174/70 R |
| 2009/0176092 A1* | 7/2009 | Ukon ...................... C08L 23/08 |
| | | 428/375 |
| 2010/0146898 A1* | 6/2010 | Pierson ................. E04D 3/3603 |
| | | 52/549 |
| 2013/0214538 A1 | 8/2013 | Himmelmann |
| 2013/0312734 A1* | 11/2013 | Kawane .................. F24S 23/77 |
| | | 126/600 |
| 2015/0226479 A1* | 8/2015 | Fujita ........................ F26B 3/30 |
| | | 34/266 |
| 2016/0091225 A1* | 3/2016 | Camacho Perez ...... C23C 22/24 |
| | | 428/34.1 |
| 2016/0116189 A1* | 4/2016 | Camacho Perez ...... C23C 22/24 |
| | | 428/34.1 |
| 2017/0364295 A1* | 12/2017 | Sardinha ............... G06F 3/0625 |

FOREIGN PATENT DOCUMENTS

| | | |
|---|---|---|
| CN | 101943129 A | 1/2011 |
| CN | 102128139 A | 7/2011 |
| CN | 202428737 U | 9/2012 |
| CN | 102705180 A | 10/2012 |
| CN | 103184773 A | 7/2013 |
| CN | 103998772 A | 8/2014 |
| CN | 105089941 A | 11/2015 |
| CN | 204755196 U | 11/2015 |
| EP | 2 829 726 A1 | 1/2015 |
| JP | 07208540 A | 8/1995 |
| JP | 2014-136849 A | 5/2004 |
| JP | 2004-217196 A | 8/2004 |
| KR | 2003-348324 Y1 | 5/2004 |
| KR | 100682325 B1 | 2/2007 |
| KR | 2007-0070110 A | 7/2007 |
| KR | 2009-0020843 A | 2/2009 |
| KR | 101072294 B1 | 10/2011 |
| KR | 2014-0087125 | 7/2014 |
| KR | 2014-0087125 A | 7/2014 |
| WO | WO 2012/056231 | 5/2012 |

OTHER PUBLICATIONS

Office Action issued by the State Intellectual Property Office of People's Republic of China in Chinese Application No. 201510405679.7, dated May 24, 2017.

International Search Report issued by the State Intellectual Property Office of People's Republic of China for International Application No. PCT/CN2016/089628, dated Sep. 30, 2016.

Notification of Reason for Refusal issued by the Korean Intellectual Property Office in Korean Patent Application No. 10-2015-0137636, dated Apr. 21, 2016.

Extended European Search Report issued in corresponding European Application No. 16823861.6, dated Feb. 12, 2019.

* cited by examiner

HEAT DISSIPATION RETAINING STRUCTURE FOR HEAT PRODUCTION DEVICE, INSTALLATION METHOD THEREOF, AND WIND TURBINE GENERATOR SET

This application is a National Phase entry of PCT Application No. PCT/CN2016/089628, filed Jul. 11, 2016, which claims priority to Chinese Patent Application No. 201510405679.7, titled "HEAT DISSIPATION ENCLOSURE FOR HEAT GENERATION DEVICE AND WIND POWER GENERATOR SET", filed on Jul. 10, 2015 with the Chinese State Intellectual Property Office, which is incorporated herein by reference in its entirety.

FIELD

The present application relates to the technical field of heat dissipation, and in particular to a heat dissipation enclosure for a heat generation device and a wind power generator set.

BACKGROUND

I. Summary

Heat generation devices ("heat generation device" is named from a point of thermology) such as power transmission cables, a transformer, an electric reactor, a motor and a switching device, are arranged in an enclosure, for example a tower and a cabin and so on, of a wind power generator set. These heat generation devices may generate heat in operation. Due to an accumulative integral effect of the generated heat, the air temperature in the enclosure, for example the tower and the cabin, of the wind power generator set may increase continuously for a certain period of time.

In addition to the heat generated by the beat generation device, the enclosure, for example, the tower and the cabin and so on, of the wind power generator set also receives solar radiation from an external natural environment, which further causes the temperature in the tower or the cabin to increase. Especially in Turpan and Toksun region in Xinjiang, China, Pakistan region, Middle East region, African tropical region and a desert zone, strong solar radiation in summer may cause the temperatures inside and outside the wind power generator set to increase significantly, which affects normal operation of the wind power generator set.

Therefore, corresponding cooling devices are required to put into operation for performing an active cooling to an internal environment of the whole machine which also includes local environments such as the tower, the cabin, an inner cavity of a hub and an interior of a converter cabinet.

II. Related Radiation Terms Used in the Present Application

Absorption: a process of a substance converting the intercepted radiant energy thereof into internal thermal energy.

Absorptivity: a share of the projected radiation absorbed by a substance.

Blackbody: an ideal emitter and absorber.

Emission: a process of a substance at a limited temperature producing radiation.

Emissivity: a ratio of radiation emitted by a substance to radiation emitted by a blackbody at the same temperature.

Reflection: a process in which a direction of radiation projected onto a surface is changed.

Reflectivity: a share of the projected radiation reflected by a substance.

Thermal radiation: electromagnetic energy emitted by a substance with a limited temperature, which is concentrated in a spectral region ranging from 0.1 μm to 100 μm.

III. Solar Radiation and Environmental Radiation

The so-called "environmental radiation" refers to radiation of certain components, with radiation capabilities, in the earth and the atmospheric layer. Long-wave radiation in the environmental radiation includes emission of the earth's surface and emission of certain components from the atmosphere. An emission power of the earth's surface may be calculated according to a conventional method, that is, $E=\varepsilon\sigma T^4$, where $\varepsilon$ and $T$ are the emissivity of the ground surface and the thermodynamic temperature of the earth's surface respectively. The emissivity is close to 1 and the temperature ranges from −40 degrees Celsius to −460 degrees Celsius. The emission is approximately concentrated in a spectral region ranging from 4 μm to 40 μm, and a peak wavelength is about 10 μm. Most of the atmospheric radiation comes from $CO_2$ and $H_2O$ molecules, and is concentrated in a spectral region of 5 μm to 8 μm and a spectral region above 13 μm. The projected radiation from the atmospheric emission may be expressed as $G_{atm}=\sigma T^4_{sky}$, where $T_{sky}$ is called an effective sky temperature. A value of the effective sky temperature is related to an atmospheric condition, and a range of the value of the effective sky temperature may be from 230K under a cold condition with clear sky to 285K under a warm condition. At night, the atmospheric emission is the only projected radiation source on the earth's surface.

Since the solar radiation is concentrated in a short-wave spectrum region, and the emission of the earth's surface is in a much longer wavelength region, that is, each of the earth's surface and a substance may have a solar absorptivity different from its emissivity. The ratio $\alpha/\varepsilon$ is an important engineering parameter, and the ratio $\alpha/\varepsilon$ is required to be low if it is desirable for the thermal energy to be discharged from the earth's surface. As illustrated in Table 1: the use of white paint facilitates thermal resistance and thermal insulation, and under the same condition, the use of a black paint on a surface may cause the temperature of the surface to be significantly higher than the temperature of the surface coating a white paint.

TABLE 1

Ratios of absorptivity to emissivity of different materials and coatings

| surface | absorptivity | emissivity | ratio of absorptivity to emissivity |
|---|---|---|---|
| evaporated aluminum film | 0.09 | 0.03 | 3.0 |
| white paint on a metallic substrate | 0.21 | 0.96 | 0.22 |
| black paint on a metallic substrate | 0.97 | 0.97 | 1.0 |
| dull stainless steel, just obtained | 0.50 | 0.21 | 2.4 |

IV. Thermal Environment Inside and Outside the Enclosure for Example the Tower and the Cabin It is regulated in "Standard measurement for construction area of building" GB T50353-2005 that an enclosure refers to members (further including some fittings) defining a building space to resist adverse influence from the environment, such as a wall, a door, a window which surrounds a circumference of a building space. The enclosure generally refers to an external enclosure such as an external wall, a roof, and so on. The external envelop structure includes an external wall, a roof, a lateral window and an external door and so on, for resisting wind and rain, temperature change and sun radiation and so on, and should have performances of heat preservation, heat insulation, sound insulation, waterproof, moisture-proof, fire-resistant and durability.

A "sunny side" of a building mainly refers to a sunny south side (in the northern hemisphere) and secondly refers to an east side and a west side which can be irradiated by the sun, and a "shady side" of the building mainly refers to a north side (in the northern hemisphere) which cannot be irradiated by the sun. In a heat transfer process of a tower body of a wind power generator, radiative heat exchange is an important manner for heat transfer, which includes transfer of solar radiation on a surface of the tower and thermal radiation exchange between inner surfaces of the tower. Although the radiative heat exchange has a direct impact on a person's feelings of coldness and hotness, it is not as easily perceived as an air temperature.

The solar radiation reaches an outer surface of the tower body by direct radiation and scattering. On the surface, conversion between properties of energy occurs: the radiation energy is converted into the thermal energy and the thermal energy is then transferred to an anticorrosive coating of an inner wall of the tower by heat conduction. If the temperature of the surface is higher than an air temperature in the tower, the surface releases heat into the air. More importantly, a variety of power devices, such as power transmission cables, a transformer, a converter, and a power compensation device and other various heat generating sources are arranged in the tower. The closed enclosure in the tower has a heat storage capability. In summer, the tower inner wall keeps heating the air inside the tower in a rising direction, that is, a height direction, in a natural convection heat exchange manner. A case of moving not caused by an external drive force is referred to as a natural convection or a free flow. The inherent power of the fluid causing such a movement of the fluid is a temperature difference or a concentration difference (between components) of the fluid. The latter belongs to a mass transfer problem. In summer, air in the tower is heated continuously by the inner wall of the tower or heated by an inner heat source, resulting in an air temperature difference in the tower. A buoyancy lift causing the natural convection is actually caused by a joint effect of a density gradient of the fluid and a body force proportional to the density gradient. In a range of a gravitational field of the earth, the most common body force is gravity. There is no centrifugal force caused by a rotating movement in the tower, therefore the density gradient of the air is caused by the temperature difference.

The solar radiant heat reaches a maximum value at 2:00 pm or 3:00 pm, subsequently, the temperature decreases as the solar radiant heat decreases, and the temperature reaches a minimum value at a next 4:00 or 5:00 am. Obviously, in a period of time, the heat change of the temperature may be regarded as periodically fluctuating by taking 24 hours as a period. At noon, the tower is heated continuously by the solar radiation, the air temperature is high, less heat is dissipated by convective heat exchange between the air and the outer wall of the tower, and much thermal energy is effectively absorbed by the outer wall of the tower.

A sunny side of a tower wall is heated by receiving a high solar radiation continuously at and after noon, and the heat is transferred to the inner wall via the tower, causing a temperature of the inner wall to rise. Heat exchange is performed between the inner wall and the air in the tower; and the higher the temperature of the inner wall of the tower is, thus, the higher the temperature of the air in the tower heated by the heat source is. The temperature of electrical equipment in the tower will increase and exceed an upper limit, and there is a potential risk for safe operation of the electric equipment.

V. Issues of the Conventional Technology

Conventional technology discloses using a cooling system including a compressor set and an evaporator for cooling or using a fan for cooling.

However, the conventional technology only relates to heat dissipation in the cabin and does not relate to heat dissipation of the whole machine including the tower preventing heat transfer between the sunny side and the shady side by means of the temperature difference between the sunny side and the shady side. Therefore, the air in the tower, heated under a dual effect of heat transfers of an internal heat generation device and external solar radiation, rises and thus blocks a joint between a bottom of the cabin and the tower. In the operation in summer, when power generation is performed at a full power after noon, it is inevitable that, an over-temperature failure is reported, downtime is requested or power output of the generator is automatically reduced. Further, a heat dissipation system in the conventional technology has a complex structure and high manufacturing and operating costs, and requires to consume additional energy.

SUMMARY

A heat dissipation enclosure for a heat generation device is provided according to an embodiment of the present application, so as to decrease an air temperature in the enclosure actively and environmentally friendly without an external power, noise and energy consumption, and effectively address a technical issue that accumulation of heat in the enclosure causes the air temperature to exceed a normal operation environment temperature permitted by the heat generation device.

A wind power generator set having a heat dissipation enclosure is further provided to according to the embodiment of the present application.

In order to achieve the above objects, the following technical solutions are provided according to the embodiments of the present application.

A heat dissipation enclosure for a heat generation device is provided, and the heat dissipation enclosure includes an enclosure body defining an intermediate space, and a thermal radiation absorption coating is at least partially applied on an inner wall of the enclosure body.

Optionally, the thermal radiation dissipation coating is at least partially applied on an outer wall of the enclosure body.

Optionally, the thermal radiation dissipation coating is arranged on the outer wall, at a shady side, of the enclosure body.

Optionally, the thermal radiation absorption coating is arranged on the inner wall, at a shady side, of the enclosure body.

Optionally, a first thermal insulation layer is provided on an inner wall, at a sunny side, of the enclosure body.

Optionally, the first thermal insulation layer is a thermal radiation and insulation coating, a thermal insulation layer, or a radiation shielding heat shield.

Optionally, the thermal radiation and insulation coating is made of a thermal infrared paint with a low emissivity including a binder and a functional pigment with a low emissivity function, and the binder includes a chlorinated polyethylene resin, and the functional pigment with the low emissivity function includes Al powder, Zn powder, Cu powder, Ni powder or monocrystalline silicon.

Optionally, a second thermal insulation layer is applied on at least an outer wall, at the shady side, of the enclosure body.

Optionally, the second thermal insulation layer is a heat reflection and insulation coating which reflects solar radiation and ground radiation.

Optionally, the heat reflection and insulation coating includes an organosilicon acrylic resin, a silicone-alkyd rein, an acrylic resin, an epoxy resin or a polyurethane resin with a low infrared absorptivity and as a binder.

Optionally, the heat reflection and insulation coating includes $TiO_2$, ZnO, $BaSO_4$, $CaCO_3$, $ZnO_3$, talcum powder, kaolin or hollow glass micro-beads with a high infrared reflectivity and as a functional filler.

Optionally, a third thermal insulation layer is applied on an inner wall of a top layer of the enclosure body.

Optionally, the third thermal insulation layer is a thermal radiation and insulation coating.

Optionally, a sealed air thermal insulation layer is provided between the top layer of the enclosure body and the third thermal insulation layer.

Optionally, the heat generation device is arranged in a region near the inner wall, at the shady side, of the heat dissipation enclosure.

Optionally, the heat dissipation enclosure further includes a thermal radiation dissipation coating arranged on an outer wall of the heat generation device.

Optionally, the thermal radiation dissipation coating is applied on a side, facing the inner wall at the shady side of the enclosure body, of the heat generation device.

Optionally, the thermal radiation absorption coating on the inner wall of the enclosure body is arranged opposite to the thermal radiation dissipation coating on the outer wall of the heat generation device.

Optionally, the heat dissipation enclosure is a tower or a cabin of a wind power generator set, and the heat generation device is a power transmission cables or an electrical device of the wind power generator set.

Optionally, the enclosure body is a tower, and the tower has a half circumferential inner wall surface coated with the first thermal insulation layer with a low infrared emissivity and the other half circumferential inner wall surface coated with the thermal radiation absorption coating with a high infrared absorptivity; or the first thermal insulation layer with a low infrared emissivity is coated on the inner wall surface of the tower at a portion from a due east side to a northwest side of the tower for 225 degrees in total, and the thermal radiation absorption coating with a high infrared absorptivity is coated on an inner wall surface of the tower at a portion from the due east side to the northwest side of the tower for 135 degrees in total; or the first thermal insulation layer with a low infrared emissivity is coated on the inner wall surface of the tower at a portion from a southeast side to the northwest side of the tower for 180 degrees in total, and the thermal radiation absorption coating with a high infrared absorptivity is coated on the inner wall surface of the tower at a portion from the due east side to the northwest side of the tower for 135 degrees in total; or the first thermal insulation with a low infrared emissivity is coated on the inner wall surface of the tower at a portion from a due south side to the northwest side of the tower for 135 degrees in total, and the thermal radiation absorption coating with a high infrared absorptivity is coated on the inner wall surface of the tower at a portion from a northeast side to the northwest side of the tower for 90 degrees in total.

Optionally, the enclosure body is a tower, and a thermal insulation layer is provided on an inner wall surface at portions on a west side, an east side, a southwest side and a southeast side of a wall of the tower; or the enclosure body is a cabin, and each of a top surface, a west surface and an east surface of the cabin is provided with a thermal insulation layer.

In addition, an installation method for a heat generation device is further provided according to the present application, which includes: arranging the heat generation device in an intermediate space of the heat dissipation enclosure for the heat generation device according to any one of the embodiments described above and close to a side, provided with the thermal radiation absorption coating, of the inner wall of the enclosure body.

A wind power generator set is provided, which includes a tower and/or a cabin, and the tower and/or the cabin is configured as the heat dissipation enclosure for the heat generation device described above.

The heat dissipation enclosure for the heat generation device and the wind power generator set according to the embodiments of the present application are capable of reducing the air temperature of the environment in the enclosure actively under a condition without the aid of an external power, environment-friendly, noiseless and with zero energy consumption, and thus the temperature of the heat generation device is reduced, which ensures that the heat generation device can operate at an allowable normal temperature for a long time.

Furthermore, according to the second law of thermodynamics, by means of the enclosure such as the tower, such a "cold source" with a low air temperature in an "inner wall surface at a shady side" of the tower and its close surface is found, which allows the enclosure to play a function of being capable of effectively reducing a surface temperature of the heat generation device such as the power transmission cables in the tower of the wind power generator set, extending the service life of the heat generation device, and ensuring safe operation of wind power generation.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. The drawings in the following description are only examples of the present application, and for the person skilled in the art, other drawings may be obtained based on these drawings without any creative efforts.

FIG. 9 is a view of an enclosure of a wind power generator set viewed from the wind direction, and FIG. 10 is a view of the enclosure of the wind power generator set viewed from a lateral direction perpendicular to the wind direction.

Figure 1:
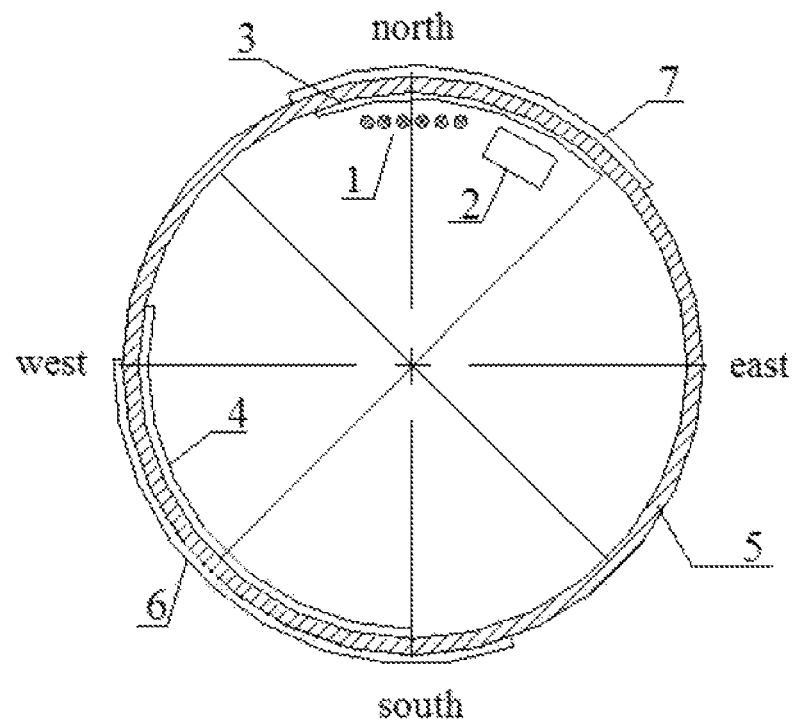
FIG. 1 is a schematic sectional view of a heat dissipation enclosure according to an embodiment of the present application.

Summary of reference numerals:

| | |
|---|---|
| 5. enclosure body. | 1. power transmission cables, |
| 2. electrical device, | 3. thermal radiation absorption coating, |
| 7. thermal radiation dissipation coating, | 4. first thermal insulation layer, |
| 6. second thermal insulation layer, | 8. third thermal insulation layer, |
| 9. sealed air thermal insulation layer, and | 10. top layer. |

DETAILED DESCRIPTION OF EMBODIMENTS

A heat dissipation enclosure for a heat generation device and a wind power generator set according to embodiments of the present application are described in conjunction with the drawings in detail below.

First Embodiment

As shown in FIG. 1, the heat dissipation enclosure for the heat generation device includes an envelope enclosure body 5 defining an intermediate space, in which the heat generation device, for example power transmission cables 1 and an electrical device 2 (e.g. a converter), is provided. A thermal radiation absorption coating 3 is at least partially applied on an inner wall of the envelope enclosure body 5.

The heat generation device such as the power transmission cables 1 and the electrical device 2 may generate heat in the operation, causing the temperature to be increased and heat to be radiated outwards. In this embodiment, the inner wall of the envelope enclosure body 5 is at least partially applied with the thermal radiation absorption coating 3, which, due to having high absorptivity for thermal radiation, can actively and efficiently receive and absorb thermal radiation emitted by the heat generation device. The heat absorbed by the thermal radiation absorption coating 3 is further transferred outwards via the envelope enclosure body 5, that is, a heat transfer passage is built up, through which the heat generated by the heat generation device is transferred radially outwards with the aid of the enclosure body 5, and the envelope enclosure body 5 is allowed to conduct heat to an outer surface, thus avoiding quick accumulation of the heat, generated by the heat generation device, in the envelope enclosure body 5, which may otherwise cause the temperature of the heat generation device to exceed a normal operation temperature of the heat generation device.

Figure 2:
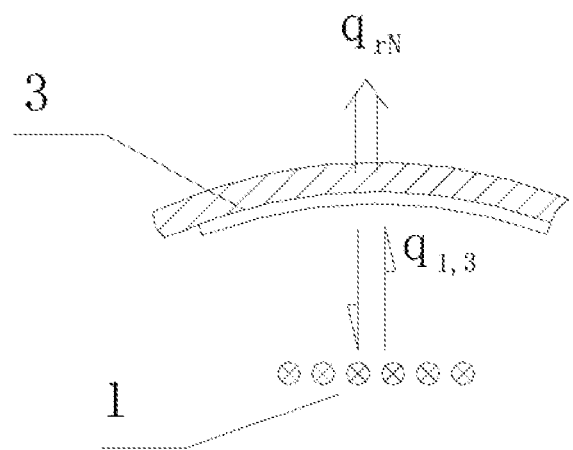
FIG. 2 is a schematic view showing radiative heat transfer of the heat dissipation enclosure according to the embodiment of the present application by means of a thermal radiation absorption coating on an inner wall of the heat dissipation enclosure.

FIG. 2 shows radiative heat exchange between the envelope enclosure body 5 applied with the thermal radiation absorption coating 3 and the heat generation device. Specifically, $q_{1,3}$ indicates a speed of radiative heat exchange between the heat generation device and the inner wall of the envelope enclosure body 5, and $q_{1,3}$ indicates a thermal radiation speed of the outer wall of the envelope enclosure body 5 emitting heat to an external natural environment. The higher the absorptivity of the thermal radiation absorption coating layer 3 is, the greater the speed $q_{1,3}$ of radiative heat exchange between the heat generation device and the inner wall of the envelope enclosure body 5 is. High speed $q_{1,3}$ facilitates heat dissipation and cooling of the heat generation device. The greater the emissivity of the outer wall of the envelope enclosure body 5 is, the greater $q_{rN}$ is. Greater $q_{rN}$ facilitates the heat dissipation and cooling of the envelope enclosure body 5. In the case that a temperature of the envelope enclosure body 5 is decreased, a temperature difference between the heat generation device and the envelope enclosure body 5 will become larger or be maintained in an appropriate range, and thus the speed $q_{1,3}$ of radiative heat exchange between the heat generation device and the inner wall of the envelope enclosure body 5 will increase or be at least maintained at a high level. As such, a virtuous cycle is formed, which may ensure a good heat dissipation and cooling of the heat generation device.

According to materials and preparation processes, the thermal radiation absorption coating 3 mainly includes the following four types. In the embodiments of the present application, different types of coatings may be used individually or may alternatively be used in combination.

(1) Paint Coating

The paint coating is generally prepared by a compressed air spraying method. Common paint coatings include:

$FeO_3$—$Cr_2O_3$ coating, in which, $Fe_2O_3$, $Cr_2O_3$ and $MnO_2$ are used as a pigment, an organic silicon modified acrylic resin is used as a binder, and an absorptivity-emissivity ratio of the coating may reach 3.26;

PbS (dendritic crystal) coating, in which, dendritic crystal PbS with 0.1 μm is used as a pigment, an ethylene propylene rubber or a fluorine resin is used as a binder, an absorptivity ranges from 0.85 to 0.91, and an emissivity ranges from 0.23 to 0.40;

Silica sol heat absorbing coating, in which, silica sol is used as a binder, Fe powder is used as a color body, and the coating has a low cost, good weather resistance and water proofness, an absorptivity of 0.94 and an emissivity of 0.41;

Phthalocyanine green coating, in which, a pigment component is $Fe_3CuO_5$, and the coating has a good decorative performance and a high absorptivity-emissivity ratio; and Black chromium selective absorption coating prepared by a powder flame spraying method, which has a simple process, a low cost, stable performance, good spectrum selectivity, a heat radiation absorptivity of the black chromium selective absorption coating is 0.91, and an emissivity of the black chromium selective absorption coating is 0.15.

(2) Vacuum Plating Coating

The vacuum plating coating is prepared by vacuum evaporation and magnetron sputtering technology, for example a PbS/Al/Al coating prepared by direct evaporation. Coatings prepared by the magnetron sputtering technology include: a stainless steel-carbon/copper coating, an AlCN coating, an $AlN_xO_y$ coating and a Ni—Cr coating and a multilayer gradient aluminium nitrogen aluminium (Al—N/Al) coating. The vacuum plating coating further includes a metal ceramic composite coating prepared by radio-frequency sputtering, which is mainly applied in a high temperature field, and is a new process developed in recent years, for example, a Ni—$Al_2O_3$ coating; a Wu-$AlN_x$ coating, which is a metal ceramic composite coating obtained by doping metal particles such as Wu and chromium into an aluminum nitride medium; a Ni:$SiO_2$ metal ceramic absorption coating, in which, a volume ratio of Ni on a surface of the coating is 10% and gradually changes to 90% at the bottom of the coating, and the coating has a thickness ranging from 100 nm to 170 nm, an absorptivity of the coating is 0.96 and an emissivity of the coating ranges from 0.03 to 0.14; an aluminium oxide adoping molybdenum (Mo—$Al_2O_3$) metal ceramic coating, $Al_2O_3$ is used as an antireflection layer, a dual layer metal ceramic coating of Mo—$Al_2O_3$ is used as an absorption layer, Mo or Cu is used as an antireflection layer, the coating has a stable performance at 350 Celsius degrees, and an absorptivity of the coating is 0.96 and an emissivity of the coating is 0.11.

(3) Electrochemical Conversion Coating

Common electrochemical coatings include: an aluminum anode oxide coating, a CuO conversion coating and a steel anode oxide coating. Such coatings generally have an absorptivity ranging from 0.88 to 0.95 and an emissivity ranging from 0.15 to 0.32. The aluminum anode oxide coating has a good spectrum selectivity, corrosion-resistance and light resistance. The CuO conversion coating has a layer of black suede, and the performance of the coating is apt to be degraded if the black suede is damaged. The steel anode oxide coating has good ultraviolent-resistance and moisture resistance. Common electrochemical coatings further include a Mo black chemical conversion coating which has a maximum absorptivity of 0.87 and an emissivity ranging from 0.13 to 0.17.

(4) Electroplating Coating

Common electroplating coatings mainly include: a black nickel coating, a black chromium coating and a black cobalt coating and so on, which all have good optical performances. The black chromium coating and the black nickel coating have the best performances, and their absorptivity-emissivity ratio ($\alpha/\varepsilon$) is close to 6 to 13. However, the electroplating black chromium has a high production cost, and Cr6+ in the plating solution pollutes the environment. Producing the electroplating black nickel consumes low energy and the electroplating black nickel has a low production cost, and no toxic substance exists in the plating solution. However, the black nickel plating coating is thin, and has poor thermal stability and poor corrosion resistance. An absorptivity of the black nickel plating coating can be up to 0.93, and the black nickel plating coating has strong durability, strong thermal stability and strong anti-corrosion capability. Since being sulfur-free, the developed black nickel-tin alloy coating can overcome the defects of the black nickel plating coating.

In order to further improve heat dissipation effect, a thermal radiation dissipation coating 7 is further at least partially applied on the outer wall of the envelope enclosure body 5 in this embodiment. The thermal radiation dissipation coating 7, due to having a high infrared emissivity, may allow the heat to be released efficiently from the enclosure body 5 into an ambient environment in a thermally radiative manner, so as to reduce the temperature of the enclosure body 5.

Second Embodiment

Figure 3:
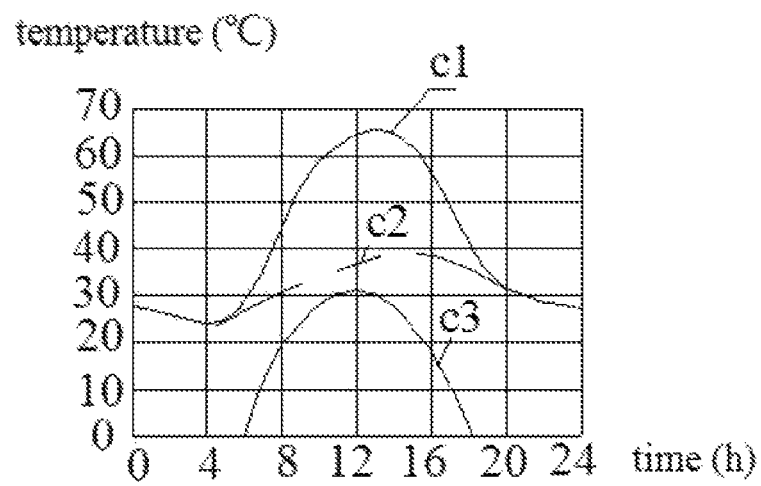
FIG. 3 shows composition of a comprehensive temperature in summer outside the heat dissipation enclosure according to the embodiment of the present application.
Figure 4:
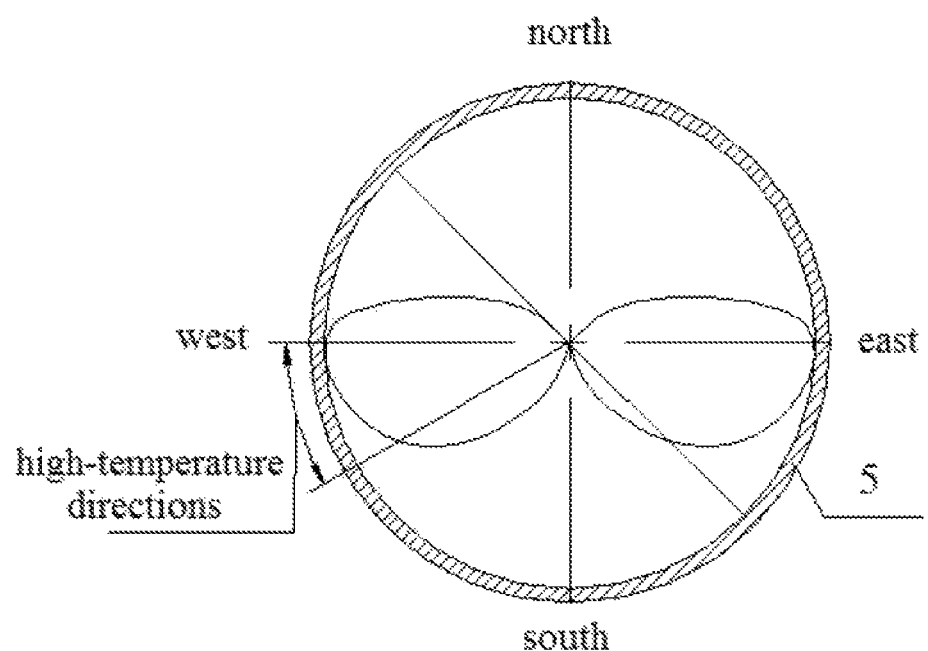
FIG. 4 shows solar radiation in various orientations and a high temperature range of the heat dissipation enclosure according to an embodiment of the present application in summer.

I. Analysis on an Application Environment of this Embodiment and Core Idea of this Embodiment 1. Heat Exposure Analysis on Enclosures Such as a Tower and a Cabin As shown in FIG. 3 and FIG. 4, in terms of receiving solar radiation, the enclosures, such as a tower and a cabin, of a wind power generating apparatus are different in different directions and different times. Intensity of the solar radiation received by the enclosures such as the tower and the cabin and an air temperature of the enclosure are both high from 12:00 am to 16:00 pm. These enclosures receive radiant heat, and also have heat generation devices therein, such as power transmission cables, a transformer, an electric reactor, a motor and a switching device. The air temperature in the enclosures such as the tower and the cabin may increase continuously due to an accumulative "integration" effect of the heat generated in the wind power generating apparatus. This requires to further put into operation a corresponding cooling device to perform forcibly an active cooling to an internal environment of the whole machine which also includes local environments such as the environment in the tower, the environment in the cabin, an inner cavity of a hub, an interior of a variable pitch control cabinet and an interior of a converter cabinet. When the wind power generating apparatus transmits electric energy to a power grid, such power consumption consumed by an internal device above is called "plant power consumption" in a conventional energy power generation (thermal power generation and hydropower generation). For a long time, in conversion and utilization of conventional energy, efforts have been made continuously to reduce a plant power consumption rate and increase output electric energy to a power grid side. Operation of the wind power generating apparatus is also required to reduce the "plant power consumption rate", that is, to reduce a cost paid when the electric energy is outputted to the power grid side.

In FIG. 3, a curve c1 represents a comprehensive temperature outside the tower, and a curve c2 represents an air temperature outside the tower, and a curve c3 represents an equivalent temperature of the solar radiation.

After study on a comprehensive temperature in summer of an external environment of a place where the tower is located, the inventor finds that an outer surface of the tower is subjected to three different forms of thermal action, as shown in FIG. 3.

(1) Action of solar radiant heat. When the solar radiant heat is projected onto outer surfaces of such enclosures as the tower and the cabin, part of the radiant heat is absorbed by a protective coating of the outer surfaces.

(2) Heat transfer of air outside the tower. In the case that there is a temperature difference between a temperature of the coating of the outer surface of the tower or the cabin and a temperature of the air outside the tower or the cabin, heat exchange will be carried out between the coating and the air outside the tower or the cabin in a form of convective heat transfer.

(3) After the outer surface of the tower is subjected to the above two functions, a temperature of the outer surface rises, and radiation capability of the outer surface increases, and the outer surface emits a long-wave radiation to the natural environment, losing pan of thermal energy.

Among outdoor climate conditions for thermal calculation of a building in summer, the solar radiation and an outdoor air temperature are two most important conditions. Although the manner of heat exchanging between the solar radiation and an outer coating of the tower is different from the manner of heat exchanging between the air outside the tower and the outer coating of the tower, their effects are both to increase the temperature $\theta_c$ of the outer coating of the tower and the cabin. For simplifying calculation, an assumed $t_{sa}$ indicating a "comprehensive temperature outside the tower or the cabin" is used to replace combined functions of both the solar radiation and the outdoor air temperature. Heat flow q obtained by the outer coating of the tower or the cabin from the external environment of the tower and the cabin may be expressed as: $q_1$ indicating a share, absorbed by surfaces of the enclosures such as the tower and the cabin, of the solar radiation projected on the surfaces; and $q_2$ indicating a share of heat exchange carried out in a form of convective heat exchange (heat transfer coefficient $\alpha_c$ of convective heat exchange surface) between surfaces of the enclosures such as the tower and the cabin and air outside the tower or the cabin in the case that there is a temperature difference between a temperature of the surfaces of the enclosures such as the tower and the cabin and the temperature of the air outside the tower and the cabin.

$$q = q_1 + q_2$$
$$q = \rho_s I + \alpha_e(t_e - \theta_e)$$
$$q = \alpha_e\left(\frac{\rho_s I}{\alpha_e} + t_e - \theta_e\right)$$
$$q = \alpha_e(t_{sa} - \theta_e)$$
$$t_{sa} = \frac{\rho_s I}{\alpha_e} + t_e$$

Where I is illumination intensity of solar radiation:

$\rho_s$ indicates solar radiation energy absorption coefficient (share) of an outer coating of enclosures such as the tower or the cabin;

$t_{so}$ indicates a comprehensive temperature outside the enclosures such as the tower or the cabin; and $$\frac{\rho_s I}{\alpha_e}$$

indicates an equivalent temperature of solar radiation.

The comprehensive temperature outside the tower and the cabin represents the thermal functions of the outdoor air temperature, the solar radiation and atmospheric longwave radiation on a given outer surface in terms of temperature values. The comprehensive temperature outside the tower or the cabin includes three parts: (1) outside air temperature, (2) solar radiation absorbed by the outer surface, and (3) long-wave radiation exchange between the tower or the cabin and the external environment. In fact, an outdoor comprehensive temperature is a theoretical air temperature with an assumption that there is no other radiation. Thermal function of the outdoor comprehensive temperature on the given outer surface is the same as combined thermal actions of the solar radiation, the atmospheric long-wave radiation and the air temperature on the given outer surface.

TABLE 2 solar radiant heat absorption coefficient of some materials

| Surface | $\alpha_s$ | $\varepsilon(300K)$ | $\alpha_s/\varepsilon$ |
|---|---|---|---|
| White paint coated on a metallic substrate | 0.21 | 0.96 | 0.22 |
| Black paint coated on a metallic substrate | 0.97 | 0.97 | 1 |
| Dull stainless steel | 0.5 | 0.21 | 2.4 |
| Red brick | 0.63 | 0.93 | 0.68 |
| Snow | 0.28 | 0.97 | 0.29 |
| Corn leaf | 0.76 | 0.97 | 0.78 |

Taking a current 2.5 MW wind power generator set of Xinjiang Goldwind Science and Technology Co., Ltd. as an example, following data is disclosed to the industry: an average value of an inner diameter of the tower of 3.9 meters, a height of the tower of 90 meters, air volume in a tower of 915 m³, and in the case that the air in the tower is at 50 Celsius Degrees, a specific heat capacity of the air in the tower under a constant pressure of 1.005 kJ/(kg·K) and a density of the air in the tower of 1.093 kg/m³. Therefore, it may be known that in the case that a temperature of the air in the tower increases or reduces by 1 Celsius degree, the amount of heat which is required to be absorbed by the air or is necessarily released from the air is 1005 kJ (1.005× 1.093×915×1=1005 kJ). Buoyancy lift generated by the air when being heated is $$-\frac{1}{\rho}\frac{\rho_\infty - \rho}{T_\infty - T}g(T - T_\infty),$$

where change in the density of the air is mainly due to change in the temperature of the air.

This thermal energy of 1005 kJ takes the constantly buoyant heat air as a carrier and flows over into the cabin at an high position. This will destroy an original thermal equilibrium of a communicating state between the cabin and a generator air gap and cause thermal load on a cooling system of the generator to increase, which will inevitably cause air temperature of the generator air gap to exceed a standard temperature in summer. In accordance with a law of conservation of energy: in a limiting case (in the case that the generator is shut down, the cooling system is stopped working and the cabin is insulated thermally, contribution of this stream of heat flow to the thermal insulation cabin is exclusively considered), this stream of heat flow may cause the temperature of the cabin to increase continuously. Furthermore, this air flow passes by a joint between a bottom of the cabin and the tower, and a space, where the joint is located, is further communicated with a space in a hub of an impeller of the wind power generator. The joint is further provided with a variable pitch driver (a motor) and an electric machine servo control system (a power electronic system), which may both generate a considerable amount (an order of magnitude of "kilowatts") of heat consumption. A rising heat air flow functions to "block" the heat air flow in the cabin. In summer operation, it is inevitable that, an over-temperature failure is reported, downtime is requested or power output of the generator is automatically reduced when power generation is performed at a full power after noon.

2. Characteristics of the Comprehensive Temperature Outside the Tower and the Cabin (1) The comprehensive temperature outside the tower or the cabin fluctuates by taking 24 hours as a period.

(2) The comprehensive temperature outside the tower or the cabin is different for parts of the tower or the cabin in different orientations.

On the same day and at the same location, if the orientation is different, a magnitude of the intensity of the solar radiation, change in the intensity of the solar radiation and the time when a maximum intensity of the solar radiation presents are all different.

Parts, in different directions, of the same tower and the same cabin are heated differently, and thus a magnitude of the comprehensive temperature outside the tower or the cabin and a law of change of the comprehensive temperature are different. Furthermore, a flat top, a west side, an east side, a southwest side and a southeast side of the cabin are subjected to maximum thermal radiation actions.

(3) A solar radiation absorption coefficient of a surface of the protective coating on the outer surfaces of the tower and the cabin has an importance impact on the comprehensive temperature outside the tower or the cabin.

3. Functions of the Comprehensive Temperature Outside the Tower and the Cabin

The comprehensive temperature outside the tower and the cabin is employed to calculate thermal performance and desired cold load of these enclosures. The enclosures such as the tower and the cabin are subjected to both an outdoor temperature and solar radiation, and a combination of both the outdoor temperature and the solar radiation is called a "comprehensive temperature", which is equivalent to an equivalent temperature value of the solar radiation plus the outdoor air temperature, considering enhancement of the solar radiation on the amount of heat of surface heat exchange. The comprehensive temperature is an equivalent outdoor temperature proposed for convenience of calculation. Therefore, the comprehensive temperature outside the tower and the cabin is not an exactly objective parameter and is effected by human factors.

A main purpose of taking thermal insulation measures on the west side, the east side, the southwest side and the southeast side of the tower is to control a temperature of an inner surface of the tower and thus to increase degree of attenuation and delay time, avoiding the temperature of the inner surface being too high and radiating a lot of radiant heat to a north side of an interior of the tower and an power device, which may otherwise cause an electrical device to be overheated.

II. Core Ideas

Since the enclosures such as the tower and the cabin of the wind power generating apparatus are different in different directions and different times in receipt of the solar radiation, it is found that a hot weather or a cold weather is mainly determined by a high air temperature or a low value air temperature, and main factors effecting the air temperature are determined by the intensity of the solar radiation. However, heat from the sunshine is not a main reason for a direct increase of the air temperature. The thermal energy absorbed directly by the air from the sunshine is only about 14% of the thermal energy of the sunshine, and about 43% of the thermal energy of the sunshine is absorbed by the ground. After the solar radiant heat is absorbed by the ground, the radiant heat is conducted to the air in a form of radiation and convection, which is the main reason for the increase of the air temperature. The sunshine is irradiated on the ground, and is absorbed by the ground to be converted into thermal energy, and the heat absorbed by the ground is then released in a form of radiative heat, and heats the air in a manner of convective heat exchange, and thus after the ground is heated, it takes a period of time for the air temperature to increase. After noon, the heat released by the ground is still less than the heat supplied by the sun, and until 2:00 pm or 3:00 pm, a ground temperature increases to a maximum and thus the air temperature reaches a highest value. After these enclosures, for example the tower and the cabin is heated continuously by the solar radiation and the heat is transferred and enters inner surfaces of these enclosure, temperatures of the inner surfaces increase such that a path of the heat generated in these enclosures to dissipate through these enclosures is weakened to a great extent. Since there is an accumulative "integral effect" in the enclosure which causes the air temperature in the enclosure of the wind power generating apparatus to increase continuously, it is required to suppress and control a temperature rise with the aid of a power cooling device, and this "cost" contains a portion of the solar energy absorbed by the enclosure. As a result, the inventor proposes a core idea of "preventing" the above enclosure from absorbing the solar energy and "creating and building" a heat dissipation channel for a tower wall with respect to a horizontal plane of the tower, that is, a heat flow transfer channel is built for an enclosure in which a heat generation device is arranged, and the heat flow transfer channel is configured to dissipate heat from an inner side of the enclosure to an outer side of the enclosure, and moreover, for an envelop structure applied in a region subjected to a strong solar radiation, a thermal insulation layer is further provided to block a transfer channel through which the solar radiant heat is transferred from an outer side of the enclosure to an inner side of the enclosure.

A specific design idea of thermal insulation is:

① Focusing thermal insulation of the enclosure outside the cabin on thermal insulation of a top surface of the cabin, followed by thermal insulation of a west surface and an east surface.

② Reducing the comprehensive temperature outside the tower, making the outer surface of the tower in light color to reduce absorption of the solar radiation, and selecting a coating material with a special function which has a low absorptivity of solar short-wave radiation and a high emissivity of solar long-wave radiation, to reduce a temperature of the outer surface of the tower.

③ Taking thermal insulation and thermal resistance measures on inner wall surfaces of tower walls on a west side, an east side, a southwest side and a southeast side of the tower walls.

III. Specific Embodiment

As shown in FIG. 1, a heat dissipation enclosure for a heat generation device according to this embodiment includes an enclosure body 5 defining an intermediate space, in which heat generation devices for example power transmission cables 1 and an electrical device 2 (e.g. a converter) are provided. A thermal radiation absorption coating 3 is applied on an inner wall, at a shady side, of the envelope enclosure body 5.

Figure 5:
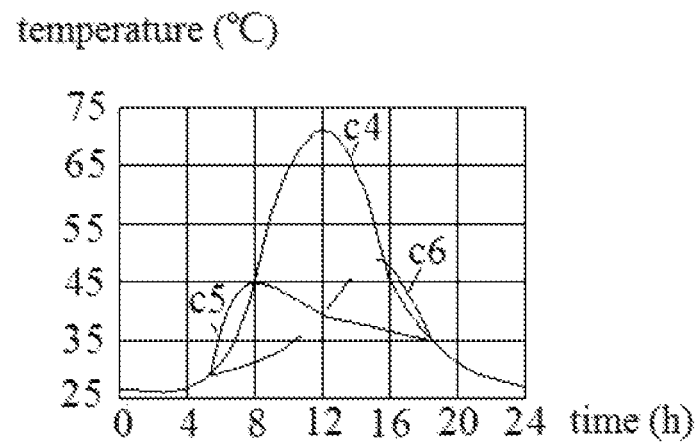
FIG. 5 is a graph showing comprehensive temperatures of a periphery of the heat dissipation enclosure according to the embodiment of the present application in different orientations.

FIG. 5 shows comprehensive temperatures in various directions outside the enclosure, and a curve c4, a curve c5 and a curve c6 indicate comprehensive temperatures of a horizontal plane, an east vertical plane and a west vertical plane respectively. In the case that the enclosure is exposed to the sun, the solar radiation are different in different directions and different times, and mainly focuses on the horizontal plane (a top side), the east vertical plane and the west vertical plane. It may be seen from FIG. 5 that after the enclosure is subjected to the solar radiation, temperatures of a top side and a sunny side from east to west of the enclosure may be much higher than a temperature of a north shady side of the enclosure after noon.

In this embodiment, a thermal radiation absorption coating 3 is provided on the shady side of the enclosure body 5, and thus, a low-temperature characteristics of the north shady side is utilized and a north side heat dissipation channel is opened, thereby enhancing heat dissipation effect.

Accordingly, a thermal radiation dissipation coating 7 with a high infrared emissivity is applied on an outer wall, at a shady side, of the enclosure body 5 in a way corresponding to the thermal radiation absorption coating 3. The thermal radiation dissipation coating 7 may be made of a solar heat reflection and insulation paint, for example a conventional RLHY-A05 type heat reflection and insulation paint. The solar heat reflection and insulation paint is a high environmental-protection type reflection thermal insulation filler which uses hollow glass micro-beads and infrared emission split as main thermal insulation fillers and contains a high-quality inorganic modified resin emulsion. The solar heat reflection and insulation paint has a compact vacuum layer formed on a surface of a basis material, and has advantages of high efficiency, thin layer, decoration, waterproof, fire protection, anti-corrosion and insulation and so on. The paint has functions of reflection, radiation and thermal insulation by hollow micro-beads. The paint can perform a high rate of reflection on infrared and ultraviolet of the sun in a range of 400 nm to 2500 nm, prevent heat of the sun from accumulating and the temperature from rising, radiate heat in a cloudy day and at night to dissipate heat and reduce the temperature, decrease a surface temperature of the object. Meanwhile, the hollow micro-beads with an extremely low heat conduction coefficient is added in the paint to isolate energy transfer, in this way, external heat can be isolated from transferring into the object even if the ambient air temperature is high. The three functions ensure that the temperature of the object coated with the paint is decreased and the inner space of the object can maintain a constant temperature state.

Figure 7:
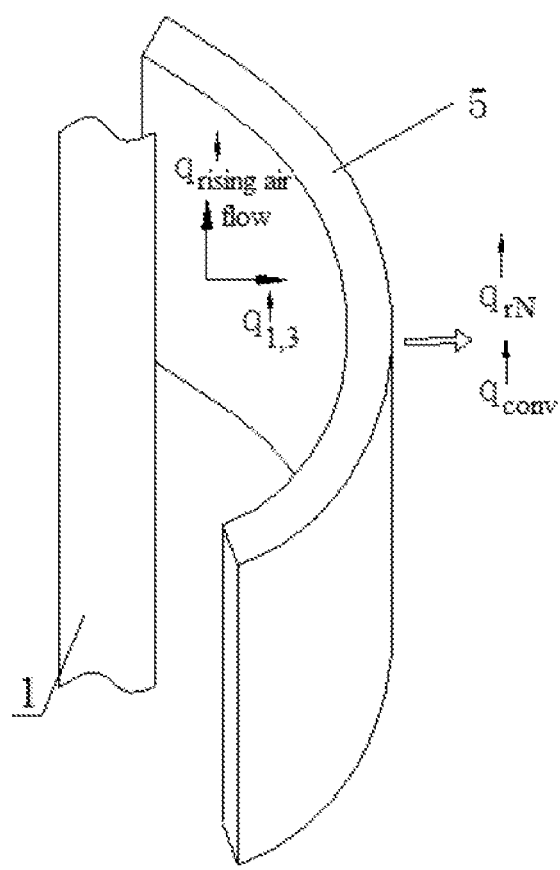
FIG. 7 is a schematic view showing radial heat transfer of a shady side of the heat dissipation enclosure according to the embodiment of the present application.

As shown in FIG. 7, a schematic view of radial heat transfer of the shady side is shown. $q_{1,3}$ indicates a speed of radiative heat exchange between the power transmission cables 1 and the inner wall of the tower 5, $q_{r_N}$ indicates a radiative heat exchange speed of the outer wall, at the shady side, of the tower 5, $q_{eonv}$ indicates a speed of convective heat exchange between the outer wall, at the shady side, of the tower 5 and the air in the natural environment outside the tower, and $q_{rising\ air\ flow}$ indicates a heat flow speed obtained by the air around the power transmission cables 1.

Figure 6:
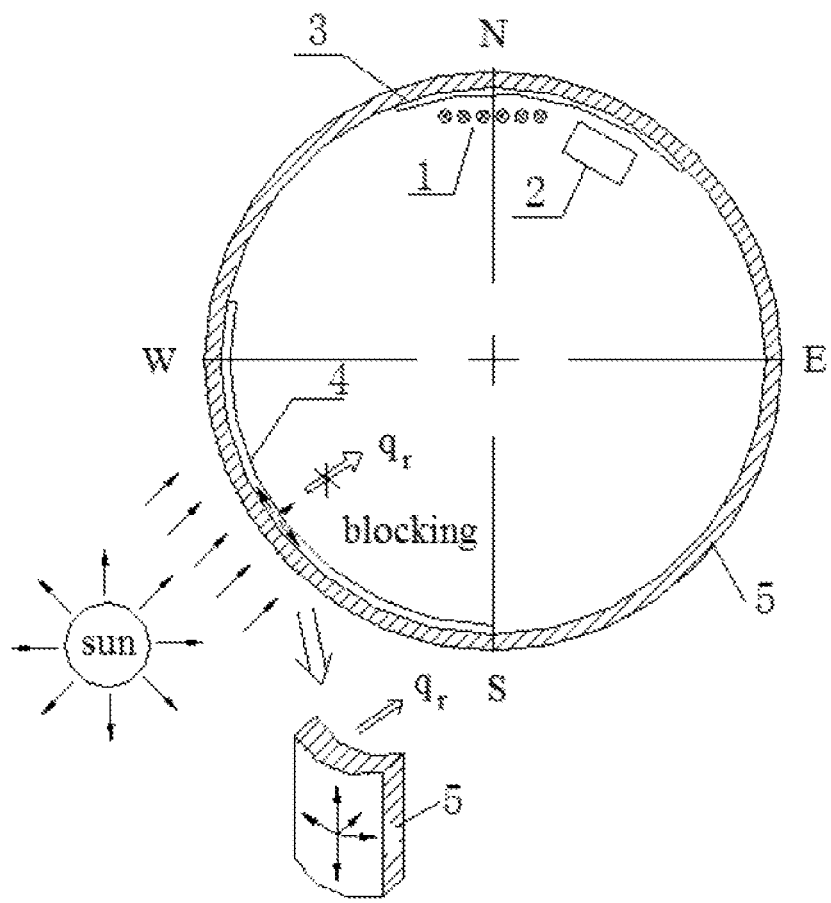
FIG. 6 is a schematic view showing transfer directions of heat absorbed by the heat dissipation enclosure according to the embodiment of the present application.

Furthermore, a first thermal insulation layer 4 is provided on an inner wall, at a sunny side, of the enclosure body 5. As shown in FIG. 6, when the solar radiant heat absorbed by the enclosure body 5 reaches the first thermal insulation layer 4, the heat can only be transferred in a circumferential direction and a vertical height direction of the enclosure body 5 since a thermal insulation function of the first thermal insulation layer 4 blocks a path through which the solar radiant heat is transferred radially inwards, thereby preventing a temperature in the enclosure body 5 from rising due to the solar radiation and thus facilitating heat dissipation of the heat generation device arranged in the enclosure body 5.

The first thermal insulation layer 4 may be a large thermal insulation layer made of a thermal insulation material such as rock wool, micro-hole calcium silicate and perlite. Thermal conductivities of the thermal insulation materials are in a very low range of 0.025 W/(m·K) to 0.05 W/(m·K) and thus the first thermal insulation layer 4 can effectively prevent the heat from being transferred into the enclosure in a manner of heat conduction.

The first thermal insulation layer 4 may alternatively be a thermal radiation and insulation coating with a low infrared emissivity coated on the enclosure body 5. The thermal radiation and insulation coating may be made of a thermal infrared paint with a low emissivity including a binder and a pigment with a low emissivity function. The binder includes a chlorinated polyethylene resin, and the pigment with the low emissivity function includes Al powder, Zn powder, Cu powder, Ni powder or monocrystalline silicon. The coating with the low infrared emissivity on an inner surface of the enclosure body 5 "blocks" a channel along which the heat flow is transferred radially inwards in a manner of heat radiation.

In this embodiment, the first thermal insulation layer 4 may alternatively be a radiation shielding heat shield covered on the inner wall, for example an aluminum foil with a low infrared emissivity and a high reflectivity.

Furthermore, referring to FIG. 1, a second thermal insulation layer 6 is provided on an outer wall, at a sunny side, of the enclosure body 5. In this embodiment, the second thermal insulation layer 6 is a heat reflection and insulation coating. The heat reflection and insulation coating prevents the enclosure body 5 from absorbing thermal radiation of the sun and the ambient environment, which reduces the temperature of the enclosure body 5 and the temperature of an interior of the enclosure body 5.

Figure 8:
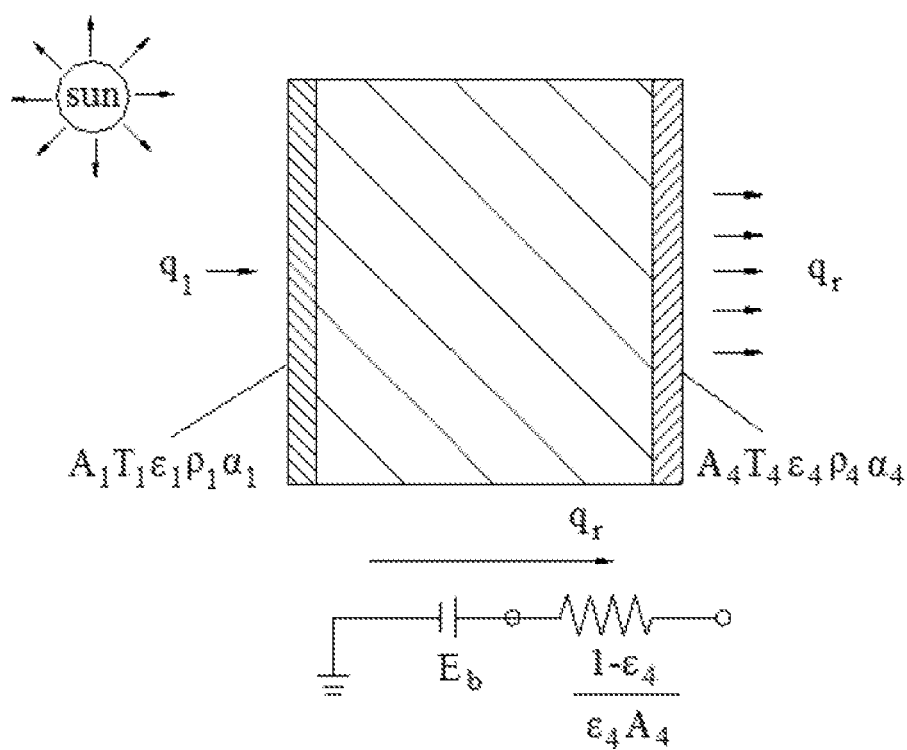
FIG. 8 shows a heat source equivalent unit network of a first thermal insulation layer and a surface radiation thermal resistance of an inner surface of a heat dissipation enclosure according to an embodiment of the present application.

FIG. 8 shows a heat source equivalent unit network of the first thermal insulation layer 4 of the inner surface and a surface radiation thermal resistance. In FIG. 8, $A_1$ indicates the area of an outer wall coating of the enclosure body 5, $T_1$ indicates the temperature of the outer wall coating of the enclosure body 5, c, indicates an emissivity of the outer wall coating of the enclosure body 5, $\rho_I$ indicates a reflectivity of the outer wall coating of the enclosure body 5, $\alpha_I$ indicates an absorptivity of the outer wall coating of the enclosure body 5, $q_I$ indicates a radiation heat flow transferred from the sun and the ambient environment to the enclosure body 5, $q_r$ indicates a radiation heat flow of an inner wall coating of the enclosure body 5, $A_4$ indicates the area of the inner wall coating of the enclosure body 5, $T_4$ indicates a temperature of the inner wall coating of the enclosure body 5, E indicates an emissivity of the inner wall coating of the enclosure body 5, $\rho_4$ indicates a reflectivity of the inner wall coating of the enclosure body 5, and $\alpha_4$ indicates an absorptivity of the inner wall coating of the enclosure body 5. In FIG. 8, $E_b$ indicates a transmit power of the inner wall coating, corresponding to the temperature of the inner wall coating, and an equation $$\frac{1-\varepsilon_4}{\varepsilon_4 A_4}$$

indicates a surface radiation thermal resistance of the inner wall coating. It may be seen from the equation that, the less the emissivity $\varepsilon_4$ of the first thermal insulation layer 4 functioning as the inner wall coating of the enclosure body 5, the greater the surface radiation thermal resistance of the first thermal insulation layer 4 is, and the better the thermal insulation effect is. By means of a material with a low emissivity ea, for example, the emissivity $\varepsilon_4$ reducing from 0.8 to 0.1, the surface thermal resistance is increased to 36 times of the original one, thereby reducing an effective radiation intensity of the coating surface.

In other embodiments, like the first thermal insulation layer 4, the second thermal insulation layer 6 may alternatively be designed as a thermal insulation layer in other forms.

A thermal insulation mechanism and common material components of a thermal radiation and insulation coating are explained below in detail.

1. Thermal Insulation Mechanism of the Heat Reflection and Insulation Coating

The solar radiation may be divided into three parts according to the wavelength. The parts occupy different proportions in the total energy, as shown in Table 3. The sun energy mainly focuses on a visible light region and a near infrared light region in a range of 400 nm to 2500 nm. When the wavelength is 500 nm, the thermal radiation of the sun is strongest. It may be seen from Table 3 that, the visible light and the near infrared light occupy 95% of the total radiation energy of the sun, therefore a surface temperature of the enclosure such as a tower and a cabin under the solar radiation can be reduced once the sun and the near infrared light are isolated, thereby reducing a cost of a device in the tower and the cabin for reducing the air temperature.

TABLE 3

Proportions of different wave bands of the sun occupying the total energy of the sun

| light region | wavelength (nm) | proportion % of occupying the total energy |
|---|---|---|
| ultraviolet light | 200-400 | 5 |
| visible light | 400-720 | 45 |
| near infrared light | 720-2500 | 50 |

Without affecting the appearance, temperatures of the tower wall and the cabin wall under the solar radiation may be reduced significantly by maximizing the reflection ratio of the near infrared light to the solar radiation. The near infrared light occupies 50% of the total energy of the solar radiation, therefore a large part of thermal radiation energy can be isolated if the near infrared radiation is suppressed. The sun heat reflection and insulation coating is a functional coating having an obvious reflection function on the near infrared radiation. In the coating, generally particles with a reflection function on the near infrared radiation are coated on the substrate, and the near infrared light in the solar radiation is reflected and scattered into an external space, thereby reducing the temperature of the object surface and the inner environment under the thermal radiation.

2. Basic Components of Heat Reflection and Insulation Coating

The heat reflection and insulation coating generally includes a resin and a functional filler. The resin generally includes an organosilicon acrylic resin, a silicone-alkyd rein, an acrylic resin, an epoxy resin or a polyurethane resin.

For a hard substrate (metal and wall and so on), generally the heat reflection and insulation paint is directly coated on a surface of the substrate to insulate heat, and the thermal insulation performance of the coating is influenced mainly by the type, particle size distribution and usage amount of the resin and the functional filler and the thickness of the coating. The resin is an essential component in the heat reflection and insulation material, which connects the functional particles with the substrate. The resin functions as a carrier for the functional particles. Differences of resins do not influence the sun heat reflection and insulation effect of the coating greatly. In practical application, a resin with a structure containing little heat absorbing groups such as C—O—C, C=O and O—H should be selected. Table 4 shows absorptivity of several different resin coatings to the sun, by taking $TiO_2$ as a filler.

The functional filler is the most important component in the sun heat reflection and insulation coating. The common functional filter includes $TiO_2$, $ZnO$, $BaSO_4$, $CaCO_3$, $ZnO_3$, talcum powder, kaolin or hollow glass micro-beads, and is mainly used to reflect near infrared radiation in the solar radiation and reduce the heat absorptivity of the object surface. The functional filler adopted in the sun heat reflection and insulation coating should have a high reflectivity and a low absorption to the solar radiation. Substance with a forbidden band width of Eg=0.5 to 1.8 eV absorbs near infrared radiation, and substance with a forbidden band width of Eg=1.8 eV to 3.1 eV absorbs visible light radiation. Therefore, in order to avoid absorbing the visible light and the near infrared light by the object, the forbidden band width Eg of the selected functional filter should be greater than 3.1 eV or less than 0.5 eV. Table 5 shows refractive indices (also referred to as refractivity or refraction) and forbidden band widths Eg of several fillers. Table 6 shows reflectivity (reflection ratios) of several white powder fillers for the near infrared radiation.

TABLE 4

Heat absorptivity of several different resin coatings

| coating | absorptivity α |
|---|---|
| organosilicon acrylic resin | 0.19 |
| silicone-alkyd resin | 0.22 |
| acrylic resin | 0.24 |
| epoxy resin | 0.25 |
| polyurethane resin | 0.26 |

TABLE 5

Refractive indices and forbidden band widths Eg of several typical fillers

| | filler | | | | | |
|---|---|---|---|---|---|---|
| | $TiO_2$ (a rutile type) | $TiO_2$ (an anatase type) | ZnO | $Al_2O_3$ | $SiO_2$ | $Fe_2O_3$ |
| refractive index | 2.76 | 2.52 | 2.20 | 1.76 | 1.46 | 2.30 |
| Eg/eV | 3.05 | 3.05 | 3.40 | 8.30 | 8.80 | 3.10 |

TABLE 6

Reflectivity (reflection ratio) of several white powder fillers to the near infrared radiation

| | material | | | | | | | |
|---|---|---|---|---|---|---|---|---|
| | $TiO_2$ (a rutile type) | $TiO_2$ (an anatase type) | ZnO | $BaSO_4$ | $CaCO_3$ | $ZnO_3$ | talcum powder | kaolin | hollow glass micro-bead |
| reflectivity % | 80 | 79 | 45 | 32 | 48 | 59 | 45 | 46 | 44-48 |

Figure 9:
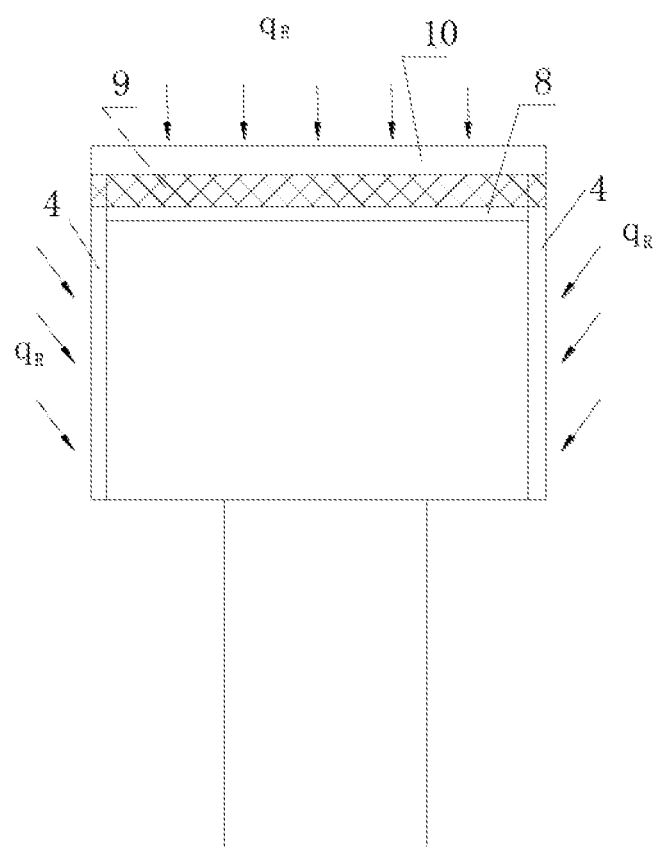
FIG. 9 and FIG. 10 are schematic views showing thermal insulation of a top of a heat dissipation enclosure according to the embodiment of the present application.
Figure 10:
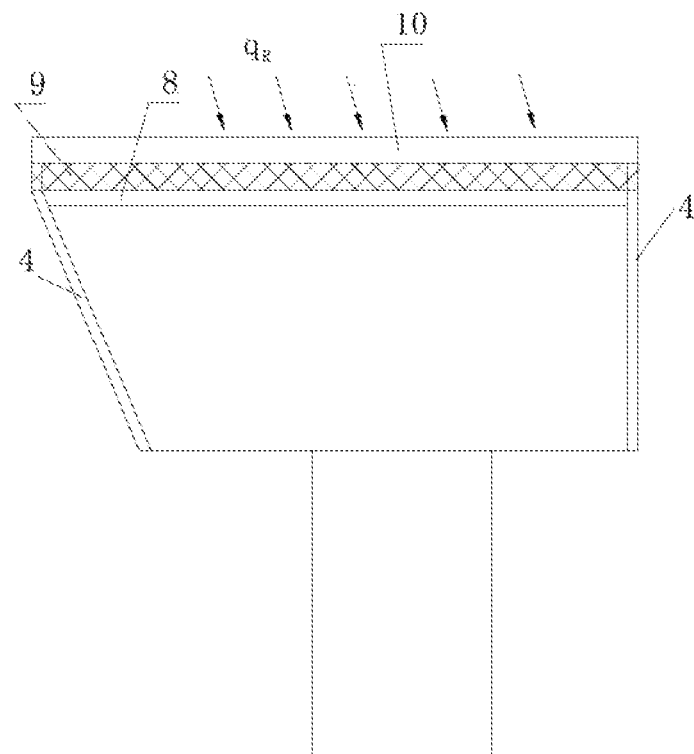

It may be seen from FIG. 5 that for the enclosure exposed to the sun, the most solar thermal radiation is absorbed by a top layer in the horizontal plane, and the top layer has a highest temperature in the case that no thermal insulation measures are taken. To this end, as shown in FIG. 9 and FIG. 10 ($q_R$ indicates the solar radiant heat in the figure), in a specific implementation, a third thermal insulation layer 8 is applied on an inner wall of a top layer 10 (for example a top wall of the cabin) of the enclosure body 5. The third thermal insulation layer 8 isolates the solar radiant heat from being transferred from the top layer of the enclosure body 5 to an interior of the enclosure body 5.

In this embodiment, the third thermal insulation layer 8 is implemented as a thermal insulation coating with a low infrared emissivity or as an attached material with a low emissivity, for example, an aluminum foil. Furthermore, the enclosure body 5 further includes a sealed air thermal insulation layer 9, which is arranged between the third thermal insulation layer 8 and the top layer 10.

The third thermal insulation layer 8 and the sealed air thermal insulation layer 9 may be implemented individually or in combination. A combination of the third thermal insulation layer 8 implemented as a thermal insulation coating with a low infrared emissivity and the sealed air thermal insulation layer 9 blocks the heat from being transferred to the interior of the enclosure in two manners of heat convection and heat radiation, which provides better effect of thermal insulation.

Furthermore, the heat generation device is arranged in a region near the shady side. Since the shady side of the enclosure does not receive the solar thermal radiation, the region, near the shady side, in an interior space of the enclosure has a temperature generally lower than a temperature of a region near a sunny side. The heat generation device is arranged in the region near the shady side such that there is a large temperature difference between the heat generation device and its surrounding air, which facilitates heat dissipation of the heat generation device.

In this embodiment, a heat dissipation coating with a high infrared emissivity is applied on an outer wall of the heat generation device. Preferably, the heat dissipation coating is applied on a side, facing the inner wall at the shady side of the enclosure body 5, of the heat generation device. With the heat dissipation coating, the capability of the heat generation device to dissipate heat in a manner of thermal radiation is enhanced, and the heat dissipation coating, in combination with the thermal radiation absorption coating 3 arranged on the inner wall of the enclosure body 5, forms a heat dissipation channel, allowing heat dissipation from an inner side to an outer side of the heat generation device, which further reduces the temperature of the heat generation device.

In this embodiment, the heat dissipation enclosure may be configured as a tower or a cabin of a wind power generator set, and the heat generation device may be an electrically-controlled device such as the power transmission cables 1 or the electrical device 2 which is arranged in the wind power generator set.

A main beneficial effect of the embodiment of the present application lies in that, under a condition without the aid of an external power, and environment-friendly, noiseless and with zero energy consumption, an air temperature of the environment in the enclosure is reduced actively and thus the temperature of the heat generation device is reduced, which facilitates ensuring that the heat generation device operates at an allowable normal temperature for a long time.

Third Embodiment

A wind power generator set is provided according to this embodiment, which includes a tower and/or a cabin, and the tower and/or the cabin is configured as the heat dissipation enclosure according to the first embodiment or the second embodiment of the present application. For those not mentioned in this embodiment, one may refer to the first embodiment and the second embodiment.

The thermal radiation absorption coating 3 and the first thermal insulation layer 4 on surfaces, at corresponding locations and orientations, of an inner side of the tower wall are preferably arranged by the following four solutions (as shown in FIG. 1 and FIG. 6):

First solution: coating the first thermal insulation layer 4 with a low infrared emissivity on an inner wall surface of the tower at a portion starting from a due east side→a southeast side→a due south side→a southwest side→ending at 180 degrees of a semicircle on a due west side of the tower; and coating the thermal radiation absorption coating 3 with a high infrared absorptivity on the inner wall surface of the tower at a portion starting from the due east side→a northeast side→a due north side→a northwest side→ending at 180 degrees of a semicircle on a due west side of the tower.

Second solution: coating the first thermal insulation layer 4 with a low infrared emissivity on an inner wall surface of the tower at a portion starting from the due east side→a southeast side→a due south side→a southwest side→a due west side→ending at northwest 45 degrees and 225 degrees of a semicircle of the tower; and coating the thermal radiation absorption coating 3 with a high infrared absorptivity on an inner wall surface of the tower at a portion starting from the due east side→the northeast side→a due north side→ending at 135 degrees of a semicircle on the northwest side of the tower.

Third solution: coating the first thermal insulation layer 4 with a low infrared emissivity on an inner wall surface of the tower at a portion starting from 45 degrees on a southeast side→a due south side→a southwest side→a due west side→ending at 45 degrees northwest and at 180 degrees of a semicircle of the tower; and coating the thermal radiation absorption coating 3 with a high infrared absorptivity on an inner wall surface of the tower at a portion starting from a due east side→the northeast side→a due north side→ending at 135 degrees of a semicircle on the northwest side of the tower.

Fourth solution: coating the first thermal insulation layer 4 with a low infrared emissivity on an inner wall surface of the tower at a portion starting from a due south side→a southwest side→a due west side→ending at northwest 45 degrees and at 135 degrees of a semicircle of the tower; and coating the thermal radiation absorption coating 3 with a high infrared absorptivity on an inner wall surface of the tower at a portion starting from 45 degrees on the northeast side→a due north side→ending at 90 degrees of a semicircle on the northwest side of the tower.

In the wind power generator set according to this embodiment, multiple power transmission cables 1 (at least six power transmission cables or more) are fixedly arranged in proximity to a wall surface, at the shady side, of the tower, as shown in FIG. 1. The power transmission cables 1 of a large wind power generator set has a diameter up to 185 mm or more (the large wind power generator set further includes a large heat generation device or a heat source such as a transformer). The object is to use a cold wall surface having a low temperature, at a shady side, of the tower as a heat dissipation and transmission channel for the power transmission cables 1, and the method is to enhance radiative heat exchange between an outer surface of the power transmission cables 1 and the inner surface of the shady side wall of the tower. The geometrical relationship between the shady side and the power transmission cables 1 is equivalent to radiative heat exchange between an infinitely long and large arc and a number of cylinders with limited lengths. A mathematical model of heat transfer between the power transmission cables and the inner wall at the shady side is established. The multiple cables are arranged in parallel and in an arc shape and are maintained at an equal spacing or unequal spacing from the inner wall of the tower.

The wind power generator set according to this embodiment of the present application has the following beneficial effects:

The tower environment with a low-speed heat accumulation is created for a heat generation sources such as an electrical device (e.g. a converter) and a power transmission cables in the tower.

Configuration volume of the cooling device of the generator set is reduced and thus an initial investment is reduced indirectly.

An operating cost of the generator set is reduced.

An operation temperature of the above "heat source" is reduced, which extends a service life of the power transmission cables and improves a system security of power transmission.

It is beneficial to take thermal insulation measures on the closed cabin and its top for personnel and devices in winter operation and maintenance of the wind power generator, and for example, an oil system will not have a too low temperature and will not be difficult to start, and an electronic device, for example, a liquid crystal display of an intelligent device and so on, will not fail to display due to having a too low temperature.

The specific embodiments of the present application are described hereinbefore, but the scope of the present application is not limited thereto. Any variations or substitutions readily envisaged by the person skilled in the art within the scope of the disclosed technology should fall within the scope of the present application. Therefore, the scope of the present application should be based on the scope of claims.

The invention claimed is:

1. A heat dissipation enclosure for a heat generation device, wherein:
    the heat dissipation enclosure is a tower or a cabin and comprises an enclosure body defining an intermediate space and an inner wall,
    a thermal radiation absorption coating is arranged directly on a shady side of the inner wall of the enclosure body, and
    a first thermal insulation layer is provided directly on a sunny side of the inner wall of the enclosure body,
    wherein the shady side and the sunny side are different surface areas of the inner wall of the enclosure body.

2. The heat dissipation enclosure for the heat generation device according to claim 1, wherein a first thermal radiation dissipation coating is at least partially applied on an outer wall of the enclosure body.

3. The heat dissipation enclosure for the heat generation device according to claim 2, wherein the outer wall of the enclosure body comprises a shady side outer wall of the enclosure body, the first thermal radiation dissipation coating is arranged on the shady side outer wall of the enclosure body.

4. The heat dissipation enclosure for the heat generation device according to claim 1, wherein the first thermal insulation layer is a thermal radiation and insulation coating, a thermal insulation layer or a radiation shielding heat shield.

5. The heat dissipation enclosure for the heat generation device according to claim 4, wherein the thermal radiation and insulation coating is made of a thermal infrared paint with a low emissivity comprising a binder and a functional pigment with a low emissivity function, the binder comprising a chlorinated polyethylene resin, and the functional pigment with the low emissivity function comprising Al powder, Zn powder, Cu powder, Ni powder or monocrystalline silicon.

6. The heat dissipation enclosure for the heat generation device according to claim 1, wherein an outer wall of the enclosure body comprises a sunny side outer wall of the enclosure body, a second thermal insulation layer is applied on at least the sunny side outer wall of the enclosure body.

7. The heat dissipation enclosure for the heat generation device according to claim 6, wherein the second thermal insulation layer is a heat reflection and insulation coating which reflects solar radiation and ground radiation.

8. The heat dissipation enclosure for the heat generation device according to claim 7, wherein the heat reflection and insulation coating comprises an organosilicon acrylic resin, a silicone-alkyd rein, an acrylic resin, an epoxy resin or a polyurethane resin with a low infrared absorptivity and as a binder.

9. The heat dissipation enclosure for the heat generation device according to claim 7, wherein the heat reflection and insulation coating comprises $TiO_2$, $ZnO$, $BaSO_4$, $CaCO_3$, $ZnO_3$, talcum powder, kaolin or hollow glass micro-beads with a high infrared reflectivity and as a functional filler.

10. The heat dissipation enclosure for the heat generation device according to claim 2, wherein a third thermal insulation layer is applied on an inner wall of a top layer of the enclosure body.

11. The heat dissipation enclosure for the heat generation device according to claim 10, wherein the third thermal insulation layer is a thermal radiation and insulation coating.

12. The heat dissipation enclosure for the heat generation device according to claim 10, wherein a sealed air thermal insulation layer is provided between the top layer of the enclosure body and the third thermal insulation layer.

13. A heat generation device used together with the heat dissipation enclosure according to claim 2, wherein the heat generation device is arranged in a region near the shady side of the inner wall of the heat dissipation enclosure.

14. The heat generation device used together with the heat dissipation enclosure according to claim 13, further comprising a second thermal radiation dissipation coating arranged on the outer wall of the heat generation device.

15. The heat generation device used together with the heat dissipation enclosure according to claim 14, wherein the second thermal radiation dissipation coating is applied on a side, facing the shady side of the inner wall of the enclosure body, of the heat generation device.

16. The heat generation device used together with the heat dissipation enclosure according to claim 14, wherein the thermal radiation absorption coating on the inner wall of the enclosure body is arranged opposite to the second thermal radiation dissipation coating on the outer wall of the heat generation device.

17. The heat dissipation enclosure for the heat generation device according to claim 2, wherein the heat dissipation enclosure is a tower or a cabin of a wind power generator set, and the heat generation device is power transmission cables or an electrical device of the wind power generator set.

18. The heat dissipation enclosure for the heat generation device according to claim 1, wherein the enclosure body is a tower, and the tower has a half circumferential inner wall surface coated with the first thermal insulation layer with a low infrared emissivity and the other half circumferential inner wall surface coated with the thermal radiation absorption coating with a high infrared absorptivity; or the first thermal insulation layer with a low infrared emissivity is coated on the inner wall surface of the tower at a portion from a due east side to a northwest side of the tower for 225 degrees in total, and the thermal radiation absorption coating with a high infrared absorptivity is coated on an inner wall surface of the tower at a portion from the due east side to the northwest side of the tower for 135 degrees in total; or the first thermal insulation layer with a low infrared emissivity is coated on the inner wall surface of the tower at a portion from a southeast side to the northwest side of the tower for 180 degrees in total, and the thermal radiation absorption coating with a high infrared absorptivity is coated on the inner wall surface of the tower at a portion from the due east side to the northwest side of the tower for 135 degrees in total; or with a low infrared emissivity is coated on the inner wall surface of the tower at a portion from a due south side to the northwest side of the tower for 135 degrees in total, and the thermal radiation absorption coating with a high infrared absorptivity is coated on the inner wall surface of the tower at a portion from a northeast side to the northwest side of the tower for 90 degrees in total.

19. The heat dissipation enclosure for the heat generation device according to claim 2, wherein the enclosure body is a tower, and a thermal insulation layer is provided on an inner wall surface at portions on a west side, an east side, a southwest side and a southeast side of a wall of the tower; or the enclosure body is a cabin, and each of a top surface, a west surface and an east surface of the cabin is provided with a thermal insulation layer.

20. A wind power generator set, comprising a tower and/or a cabin, wherein the tower and/or the cabin is configured as the heat dissipation enclosure for the heat generation device according to claim 2.

21. An installation method for a heat generation device, comprising: arranging the heat generation device in the intermediate space of the heat dissipation enclosure for the heat generation device according to claim 2 and close to a side, provided with the thermal radiation absorption coating, of the inner wall of the enclosure body.

* * * * *